US011562557B2

(12) United States Patent
Miginnis et al.

(10) Patent No.: US 11,562,557 B2
(45) Date of Patent: Jan. 24, 2023

(54) CHARACTER-RECOGNITION SHARPNESS DETERMINATIONS

(71) Applicant: Hewlett-Packard Development Company, L.P., Spring, TX (US)

(72) Inventors: Emily Miginnis, San Diego, CA (US); Yow Wei Cheng, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 71 days.

(21) Appl. No.: 16/634,096

(22) PCT Filed: Jul. 25, 2017

(86) PCT No.: PCT/US2017/043812
§ 371 (c)(1),
(2) Date: Jan. 24, 2020

(87) PCT Pub. No.: WO2019/022725
PCT Pub. Date: Jan. 31, 2019

(65) Prior Publication Data
US 2020/0210739 A1 Jul. 2, 2020

(51) Int. Cl.
*G06V 10/98* (2022.01)
*G06T 7/62* (2017.01)
(Continued)

(52) U.S. Cl.
CPC ......... *G06V 10/993* (2022.01); *G06K 9/6201* (2013.01); *G06T 7/0002* (2013.01);
(Continued)

(58) Field of Classification Search
CPC .... G06K 9/036; G06K 9/4661; G06K 9/6201; G06K 2209/01; G06T 7/62;
(Continued)

(56) References Cited

U.S. PATENT DOCUMENTS 5,689,620 A * 11/1997 Kopec .................. G06K 9/6256
382/187
6,922,487 B2 7/2005 Dance et al.
(Continued)

FOREIGN PATENT DOCUMENTS

| CN | 10582550 | 8/2016 |
| EP | 0607323 | 7/1994 |
| WO | WO-2014092978 | 6/2014 |

OTHER PUBLICATIONS

Christian, et al., Digital Camera Resolution Measurement Using Sinusoidal Siemens Stars, Feb. 20, 2007 <http://proceedings.spiedigitallibrary.org/proceeding.aspx?articleid=1298859>.

*Primary Examiner* — Ping Y Hsieh
*Assistant Examiner* — Daniella M. DiGuglielmo
(74) *Attorney, Agent, or Firm* — Quarles & Brady LLP (57) ABSTRACT

An example electronic system is described in which an imaging device includes a lens and an image sensor. The imaging device is aligned with an optical target. The optical target includes a text character of a defined text size. An image capturer activates the imaging device to capture an electronic image of the optical target. The electronic image includes the text character of the optical target. An optical recognizer generates an optical recognition result for the character based on the captured electronic image. A sharpness detector compares the optical recognition result with a true value of the text character included in the optical target.

(Continued)

Based on the comparison, a designated or defined text size is selected as a designated resolution. The designated resolution is then associable with the imaging device, the optical target, the electronic image, or a component thereof.

17 Claims, 7 Drawing Sheets

(51) Int. Cl.
  *G06K 9/62* (2022.01)
  *G06T 7/00* (2017.01)
  *G06V 10/60* (2022.01)
  *G06V 30/10* (2022.01)
  *G06V 30/12* (2022.01)
(52) U.S. Cl.
  CPC .............. *G06T 7/62* (2017.01); *G06V 10/60* (2022.01); *G06T 2207/30168* (2013.01); *G06V 30/10* (2022.01); *G06V 30/133* (2022.01)
(58) Field of Classification Search
  CPC ........ G06T 7/0002; G06T 2207/30168; G06V 10/993; G06V 10/60; G06V 30/10; G06V 30/133
  USPC ........................................................ 382/103
  See application file for complete search history.

(56) References Cited

U.S. PATENT DOCUMENTS

| | | | |
|---|---|---|---|
| 7,362,354 B2 | 4/2008 | Lin et al. | |
| 7,405,816 B2 | 7/2008 | Ojanen et al. | |
| 9,208,551 B2 | 12/2015 | Madhani et al. | |
| 9,576,210 B1* | 2/2017 | Liu | G06T 11/60 |
| 2003/0086615 A1* | 5/2003 | Dance | G06K 9/60 |
| | | | 382/200 |
| 2013/0121610 A1* | 5/2013 | Chen | G06T 7/0002 |
| | | | 382/266 |
| 2014/0168478 A1* | 6/2014 | Baheti | G06K 9/3258 |
| | | | 348/240.99 |
| 2014/0355881 A1 | 12/2014 | Bhardwaj | |
| 2015/0049948 A1* | 2/2015 | Bala | G06K 9/18 |
| | | | 382/182 |
| 2015/0278658 A1* | 10/2015 | Hara | G06K 9/342 |
| | | | 358/1.9 |
| 2016/0034773 A1* | 2/2016 | Goncalves | G06V 10/443 |
| | | | 382/103 |
| 2017/0011272 A1* | 1/2017 | Barton | G06K 9/00442 |
| 2017/0286803 A1* | 10/2017 | Singh | G06K 9/6284 |
| 2018/0053046 A1* | 2/2018 | Barton | G06K 9/4604 |

* cited by examiner

CHARACTER-RECOGNITION SHARPNESS DETERMINATIONS

BACKGROUND

Many factors can affect the quality of imaging systems and devices during manufacturing. One factor can be the final precise alignment of various internal components such as sensors and lens elements. Another factor affecting the quality of images systems and devices can be the quality of each of the various components. Each of the various components is itself subject to imperfections during manufacturing.

BRIEF DESCRIPTION OF THE DRAWINGS

The present disclosure may be better understood by, and its numerous features and advantages made apparent to, those skilled in the art by referencing examples shown in the accompanying drawings. The use of the same reference symbols in different drawings indicates similar or identical items.

DETAILED DESCRIPTION

FIGS. 1-7 illustrate example devices and techniques for measuring or determining electronic image sharpness. Some image systems and devices are designed for the purpose of optically recognizing text. An image is captured and processed, and a recognition result is generated. The recognition process can be significantly impacted by the quality of the images provided to a recognition engine.

One optical approach for evaluating lens and imaging system resolution is a Modulation Transfer Function (MTF) or Contrast Transfer Function (CTF). Certain resolution determinations rely on a spatial frequency of alternating black/white lines (linepairs) meeting an arbitrary MTF/CTF value, often normalized from 0 to 1. An MTF/CTF of 1 is an idealization, but the higher the MTF/CTF value, the better in terms of lens quality and overall imaging system performance. Once a minimum MTF/CTF value has been achieved at a certain spatial frequency for a particular device or system, the imaging optics are considered sufficiently good enough. However, conventional approaches do not go far enough in conveying a meaningful metric to customers and end users.

To determine MTF, an imaging system or device captures an image of a slanted edge target. For CTF, linepairs are used and require a high level of print precision in an optical target as the edges of the target need to be very sharp and should not have voids. Measuring to a high level of precision equates to printing costly optical targets that wear with time. Optical targets often need frequent replacement depending on usage and quantity of light exposure.

An MTF curve can be computed by first capturing image data from an electronic image of a slanted-edge target such as a rectangle that has been rotated a few degrees. An edge spread function results from sampling the image data. Upon taking a derivative of the data, a line spread function may be calculated. A Fourier transform of the line spread function yields the MTF, which is plotted over spatial frequency. Spatial frequency is defined as alternating black and white lines that are each of a certain thickness. For example, a spatial frequency of 1 line-pair/mm means one black and white line are each 0.5 mm wide. For some imaging optics, this is not difficult to resolve and results in a relatively high MTF.

However, if an imaging device must resolve 10 line-pairs/mm, where each line width (black or white line) is 0.05 mm wide, the output MTF can be relatively low. Such a result can show that the optical device is not good at resolving finer and finer features. A general rule for acceptable image sharpness is determined by using the MTF curve to find the spatial frequency that achieves MTF50 (50% of the MTF). This frequency is then compared to a target MTF at a predefined spatial frequency. Once the target MTF has been achieved by the imaging system, the optics do not require any refinement or change.

Filtering and manipulating linepair data is challenging since much depends on the amount of noise in the image data. Noise is directly related to the quality of the optics, and complexly so. Noise can greatly impact CTF calculations because line-pair differences are directly related to CTF. Regardless of whether MTF or CTF is used for a sharpness determination, there is no real meaning to MTF and CTF if these values are not coupled with or correlated to something more relevant to users.

Some of the techniques described herein do not require a high level of precision by use of a machine learning approach trained to read and evaluate text in electronic images. Print voids and jagged edges of text in an optical target do not prevent an imaging system equipped with a machine learning approach for evaluating the text in electronic images. In fact, text with voids and edges are helpful in making sure that imaging systems and devices are not overly sensitive. Use of some of the techniques described herein for determining image sharpness provide a more meaningful measure of image sharpness and equipment utility. One measure of image sharpness as described herein uses text size legibility as a measure of ability to resolve text of a certain font or font family in a small point size on an optical target. In addition to measuring an optical quality of an imaging device or system, the techniques described herein also can be used to evaluate and further tune sharpening implementations as part of the imaging device or post processing software. The techniques enhance character recognition based on whether images pass or fail more often in comparison to the same image capturing system that does not enable the sharpening feature within the imaging device through a software controlled post process.

In an example of a system for evaluating or measuring image sharpness, an image capturer receives an image from an imaging device. An image parser isolates a portion of the electronic image, the portion including a character such as a character of a particular font. An optical character recognition (OCR) engine or portion thereof isolates the character and identifies an aspect of the character. For example, an aspect of the character may be its font, its font family, its height, its typical height, its width, its characteristic dimension, one of its characteristic dimensions, and its identity within a set of characters or within an alphabet.

A sharpness detector correlates the aspect of the character with a sharpness rating, where the sharpness rating can be used to categorize the image as passing or failing. As one example, an identity of the character determined from the image may be compared against a true value of the character, and the result of the comparison is used to select a sharpness rating. The sharpness rating may be applied to the character, the image, the imaging device, the system, or any combination thereof. Some or all of the process may be repeated. Results, along with one or more aspects of the imaging device or system, may be applied to train the OCR engine.

Figure 1:
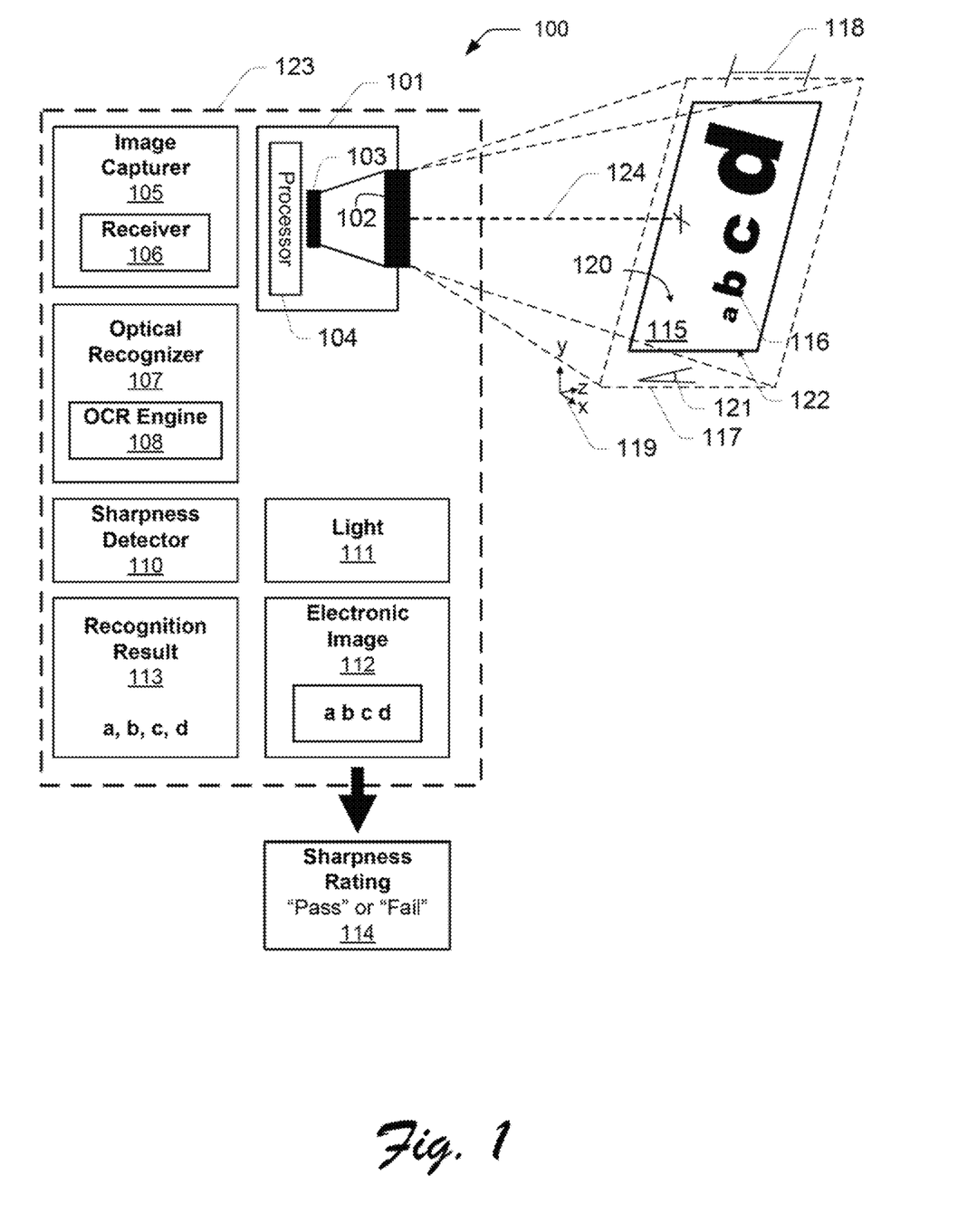
FIG. 1 is a diagram illustrating an arrangement of components of an example system to determine image sharpness based on character recognition in accordance with the present disclosure.

FIG. 1 is a diagram illustrating an arrangement of components of an example system to determine image sharpness based on character recognition in accordance with the present disclosure. In FIG. 1, a sharpness determination system 100 includes an imaging device 101. The imaging device 101 includes a lens 102 aligned with an image sensor 103. The lens 102 is comprised of one or more lens elements. The image sensor 103 is coupled to one or more processors 104. The system 100 includes an image capturer 105. The image capturer 105 includes an image receiver 106. The system 100 also includes an optical recognizer 107 comprising an optical character recognition (OCR) engine 108. The OCR engine 108 may isolate one character, more than one character, or each character when multiple characters are present in an image. The system 100 includes a sharpness detector 110 coupled to the other elements of the system 100.

The system 100 captures via the imaging device 101 an electronic image 112 of an optical target 115 that includes one or more characters 116 on a first side 120 of the optical target 115. In FIG. 1, each character 116 is of a defined text size. The optical target 115 lies within a field of view 117 of the imaging device 101. The optical target 115 can take the form of any material bearing a character such as printed characters on a paper stock or as part of a printed page, characters handwritten on a surface, characters cut from a transparent substrate, stamped characters pressed into a surface such as a metal sheet, characters etched from a surface of a substrate material, characters carved in bas relief, characters formed on a surface during injection molding, and so forth.

In FIG. 1, the optical target 115 is aligned in a plane with respect to a set of x-, y-, and z-axes 119. An orientation of the optical target 115 may be described with reference to the set of x-, y-, and z-axes 119. The characters 116 are oriented in the plane at an angle 121 with respect to a reference such as the imaging device 101 or a first edge 122 of the optical target 115. Each character 116 includes certain properties such as a characteristic dimension 118, a vertical height, a horizontal width, and a skew angle. Each character 116 may belong to a certain font or font family. The imaging device 101 and the lens 102 are aligned along an optical axis 124 relative to the optical target 115.

According to one example, a light 111 provides illumination to a first side 120 of the optical target 115 during the capture of the electronic image 112. Once the electronic image 112 is captured, the optical recognizer 107 generates a recognition result 113 of one or more of the characters 116. The sharpness detector 110 compares the recognition result 113 against a true value for the respective character 116. Based on the comparison, and one or more other considerations, a sharpness rating 114 is generated. As one example, a sharpness rating is a "pass," "fail," or other rating such as when a numerical value is compared against a pre-defined threshold. The sharpness rating 114 may be applied to the system 100, the imaging device 101 or component thereof, the electronic image 112, the optical target 115, the font or font family, the orientation of the various components, and so forth. The electronic components may be gathered into a electronic device 123 that performs operations for determining the sharpness rating 114.

Figure 2:
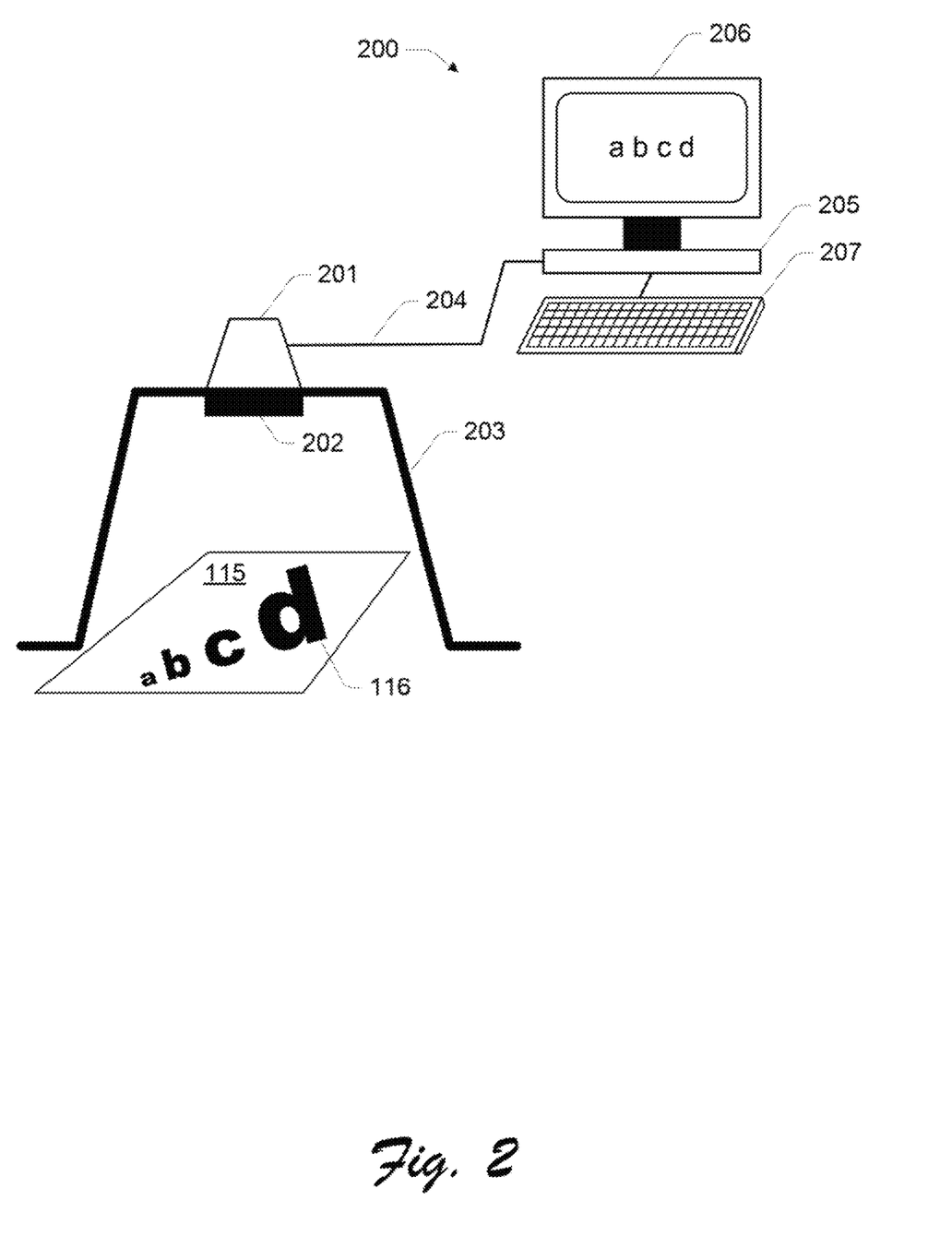
FIG. 2 is a diagram illustrating an example arrangement of components of another system to determine image sharpness based on character recognition in accordance with the present disclosure.

FIG. 2 is a diagram illustrating an arrangement of components of another example system to determine image sharpness based on character recognition in accordance with the present disclosure. In FIG. 2, the system 200 includes an image capturing device 201 comprising a lens 202. The image capturing device 201 may be under a test for sharpness. The image capturing device 201 is mounted on a support 203 above an optical target 115 that includes a character 116. The image capturing device 201 is coupled to a computing device 205 via a communication channel 204.

The computing device 205 receives input through one or more input devices such as a keyboard 207. Information derived from an electronic image of the optical target 115 is shown on an electronic display 206 coupled to the computing device 205. For example, a character 116 isolated from an electronic image is displayed on the electronic display 206 by the computing device 205. The computing device 205 displays an input request on the electronic display 206 and the computing device 205 prompts for user input when a recognition result fails to match a true value of the character 116. A user (not illustrated) enters an identity of the character in the image displayed on the electronic display. The computing device 205 accepts a digital value by way of a physical user input.

An optical recognizer is trained based on the entered character identity and electronic information derived from the image captured of the optical target 112. The user can monitor if the character's sharpness rating is correct with the intended goal of increasing the accuracy of a machine learning algorithm by preventing false positives and false negatives. This goal is achieved via the optical recognizer. The computer device may be configured to provide a sharpness resolution value for the image capturing device 201 based on the user input.

The optical recognizer may be coupled to a training database. The optical recognizer may be improved by periodically re-training it against the training database. The training database may be augmented or enhanced at various times by adding images gathered by testing various systems and devices. The addition of images may be done in batches or incrementally one by one as each additional image is captured by a system or device subject to a sharpness evaluation.

Instructions may be used to select an identifier of the device capturing a particular image where the identifier is related to a physical characteristic of the device. This is the tested device. Examples of an identifier of a device include a serial number, a physical dimension of a lens, a magnification of a lens group, and a focal length of an optical system. Other identifiers are possible. Further instructions may be used to train the optical recognizer with the identifier associated with the device, the recognition result of the character, and the true value of the character in the optical target.

Figure 3:
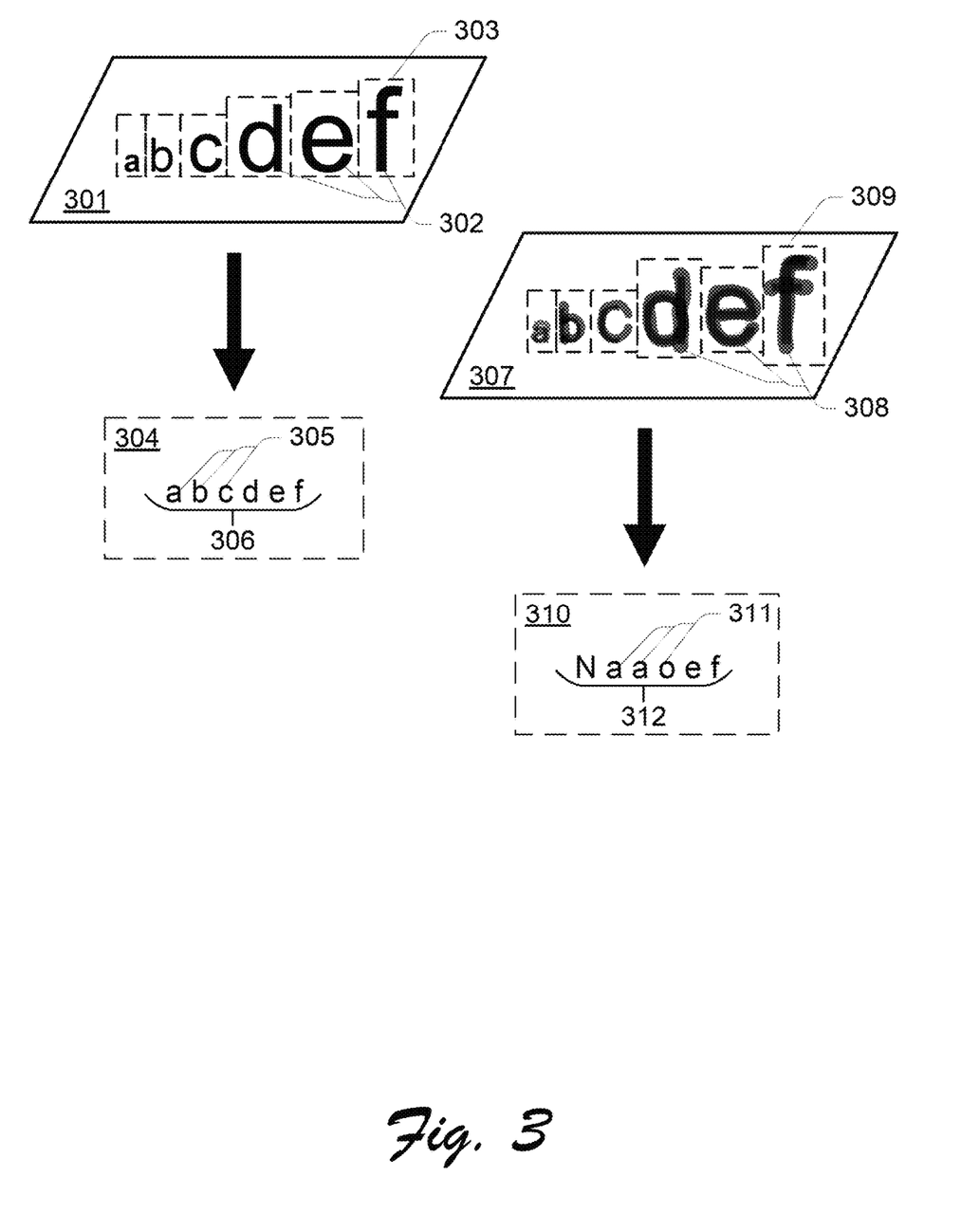
FIG. 3 is a diagram illustrating two examples of results from image capture and character recognition in accordance with the present disclosure.

FIG. 3 is a diagram illustrating two examples of results from image capture and character recognition in accordance with the present disclosure. In FIG. 3, the examples include a first portion 301 of a first electronic image and a second portion 307 of a second electronic image. The first electronic image (not shown) has been captured from a first device oriented and arranged in a first configuration relative to an optical target. The second electronic image (not shown) has been captured from a second device oriented and arranged in a second configuration relative to an optical target.

In FIG. 3, the first portion 301 includes first characters 302 isolated by respective first character boundaries 303. First character boundaries 303 are provided at a margin distance beyond four outer edges of each respective first character 302. In FIG. 3, the first characters 302 are of various sizes of one particular font such as Times New Roman. In another implementation, the first characters 302 are in a plurality of fonts or font families.

In FIG. 3, the second portion 307 includes second characters 308 isolated by respective second character boundaries 309. The second characters 308 are less sharp or less in focus relative to the first characters 302. In FIG. 3, the second portion 307 may be from a different electronic image capture device, a different electronic image capturing system, a different optical target, an image captured under different optical conditions, or a combination thereof.

A first result 304 is derived by applying OCR or a component of OCR to one or more of the characters 302 of the first portion 301. The first result 304 includes first recognized characters or first identified characters 305 that form a first character set 306. In FIG. 3, each of the first identified characters 305 corresponds to a respective true value of that character 302. A second result 310 is derived by applying OCR or a component of OCR to the second characters 308 of the second portion 307. The second result 310 includes second identified characters 311 that form a second character set 312. In FIG. 3, some of the second identified characters 311 are incorrectly identified. In particular, the first four characters of the second character set 312 should be "a," "b," "c," and "d" instead of "N," "a," "a," and "a" shown in FIG. 3. An OCR system such as system 200 of FIG. 2 may be considered an OCR pipe. According to one implementation, the OCR pipe does not post process an image to make the system determine captured letters correctly by manipulating the characters. Instead, a goal of the system is to use an ability of the imaging device or system to provide information about its optical performance and to generate an optical rating or sharpness rating for a component of the system or for the entire imaging system.

A sharpness rating can be generated by comparing one or more identified characters 305, 311 with respective true values for these characters. In FIG. 3, a first sharpness rating based on one or more of the first identified characters 305 would be better than a second sharpness rating based on the second identified characters 311.

As explained in further detail herein, various methodologies are possible for determining respective sharpness ratings based on the identified characters 305, 311, one rating for a first image including the first characters 302 and another rating for a second image including the second characters 308. As a first example, a sharpness rating may be based on identifying a first correct pairwise comparison of identified characters 305, 311 with their respective true value. For the first character set 306, a first sharpness rating would be determined based on the first character "a" being correctly identified as "a." For the second character set 312, a second sharpness rating would be determined based on the fifth character "e" being correctly identified as "e."

Figure 4:
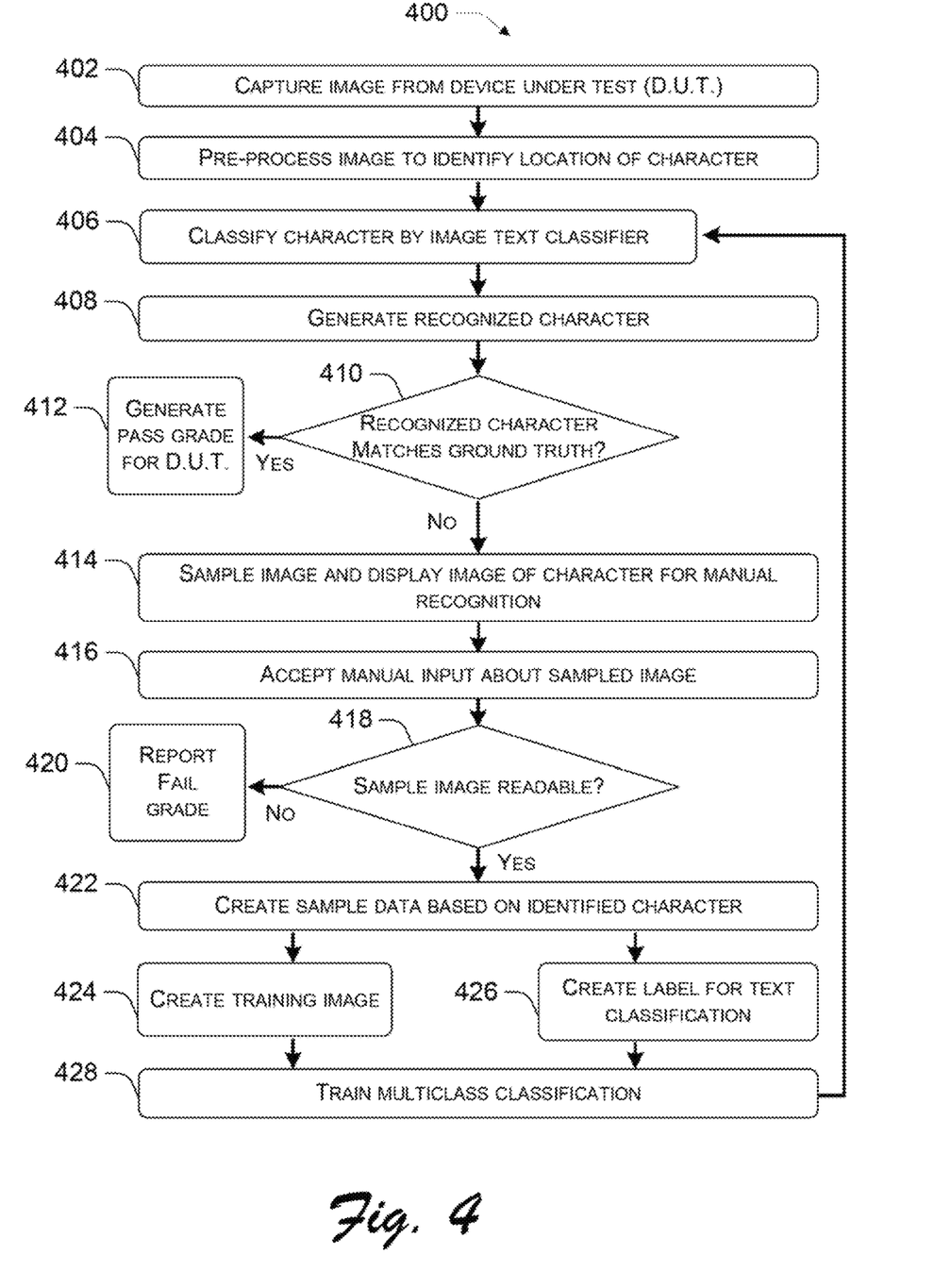
FIG. 4 is a flow diagram illustrating example process operations for training a sharpness detection system in accordance with the present disclosure.

FIG. 4 is a flow diagram illustrating example process operations 400 for training a sharpness detection system in accordance with the present disclosure. In FIG. 4, at operation 402, an electronic image is captured from a device under test (DUT) such as imaging device 101 of FIG. 1 and image capturing device 201 of FIG. 2. In FIG. 4, at operation 404 the electronic image is pre-processed to identify a location of characters in the electronic image. At operation 406, one or more characters are classified by an image text classifier. At operation 408, the one or more characters are recognized such as by an OCR engine or a component thereof. At operation 410, the recognized character is checked against its true identity or ground truth. If the character is correctly recognized, a pass grade is generated for the device under test at operation 412. If the character is incorrectly recognized, further operations are taken.

At operation 414, the electronic image is sampled, and an image of the character to be recognized is displayed for manual recognition.

At operation 416, a manual input is accepted via a user input device (e.g., mouse button event, key entry event). For example, at operation 416, a user visually inspects an image of the character displayed on an electronic screen, and a user enters a value for the character if the character is legible. That is, the character is deems to be aligned with the legibility criteria deemed acceptable. In other examples, a legible character might be human-readable as well.

At operation 418, a determination is made as to whether the sampled image is legible. That is, the sampled image is aligned with the legibility criteria. If not, at operation 420, a fail grade is reported. In other examples, a sampled image might be human-readable as well.

In FIG. 4, if a character is legible (e.g., human readable), at operation 422 sample data are created based on the identified character. Based on the sample data, at operation 424 a training image is created, and at operation 426 a label is created for text classification of the corresponding training image. At operation 428, multiclass classification is trained based on the created training image and its corresponding label from operations 424 and 426, respectively. The sample data created at operation 422 may be added to other sample data derived from one or more images taken of a same or different optical target by one or more other imaging systems or devices. By combining sample data derived from following operation 402 through operation 422, an OCR engine can be refined and further trained beyond just an original training at a factory or during an initial tuning of the OCR engine. As an example, as images are taken from a set of devices being manufactured at a factory, a substantial collection of sample data, training images, and character labels may be created for an OCR engine.

Figure 5:
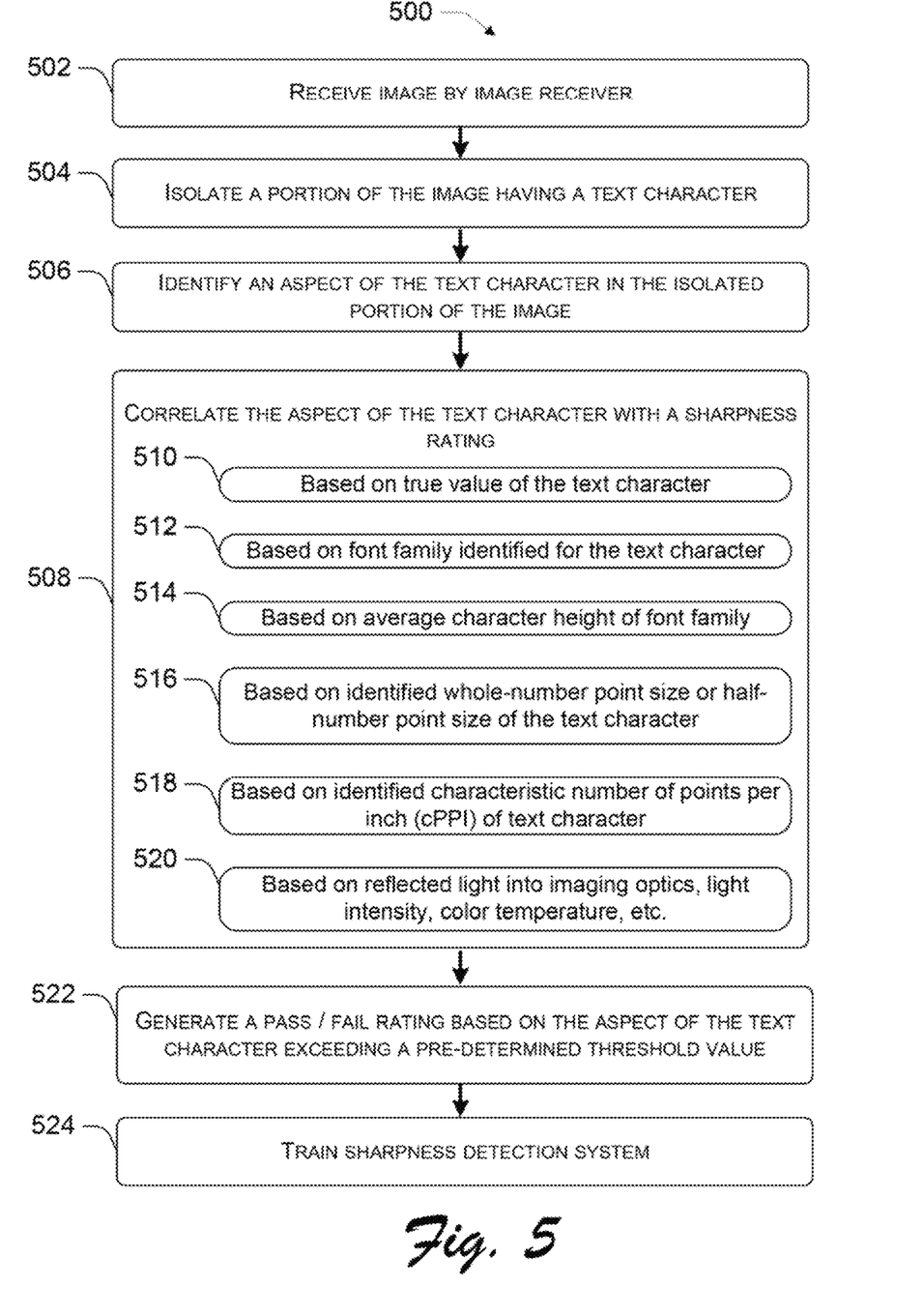
FIG. 5 is a flow diagram illustrating process operations for training a sharpness detection system in accordance with the present disclosure.

FIG. 5 is an example flow diagram illustrating process operations 500 for training a sharpness detection system. In FIG. 5, at operation 502 an image receiver receives an image for processing. At operation 504, a portion of the image is isolated where the portion includes a text character. At operation 506, an aspect of the isolated text character is identified. At operation 508, the aspect of the isolated text character is correlated with a sharpness rating.

At operation 508, correlating can include one or more operations. For example, at operation 510, the sharpness rating is adjusted based on the true value of the text character. At operation 512, the sharpness rating is adjusted based on identifying a font or font family for the text character. At operation 514, the sharpness rating is adjusted based on a character height of the isolated text character or based on an average character height of a font or font family of the isolated text character. At operation 516, the sharpness rating is adjusted based on a whole-number point size of the text character or a half-number point size of the text-character. The whole-number point size and the half-number point size can be in relation to a unit of measure of the optical target. At operation 518, the sharpness rating is adjusted based on an identified characteristic number of points per inch (cPPI) of the text character. At operation 520, the sharpness rating is adjusted such as based on a measure of light reflected off the optical target and into the imaging optics, light intensity, color temperature, etc. A measure of incident light may be made at or near the time that the image is received by the image receiver at operation 502 and used as a further modifier or descriptor of the sharpness rating. As another example of an operation, correlating can include determining a geometric aspect of the text character from the received electronic image, matching the geometric aspect to a text size of a set of predetermined text sizes, and selecting a defined text size based on the matched text size.

At operation 522, a pass/fail rating is generated based on the aspect of the text character exceeding a pre-determined threshold value. As an example, a pass/fail rating may be generated based on the defined text size exceeding a predetermined text size threshold. As another example, a pass/fail rating may include generating a pass value. At operation 524, using the sharpness rating and the isolated text character, the sharpness detector, the optical recognizer, or other component of the system is further trained thereby improving performance on subsequent recognition and sharpness tasks. The method may involve communicating the pass/fail rating. For example, a component of the system, after training for sharpness, may initiate an electronic communication that includes the sharpness rating based on the image received by the image receiver.

Figure 6:
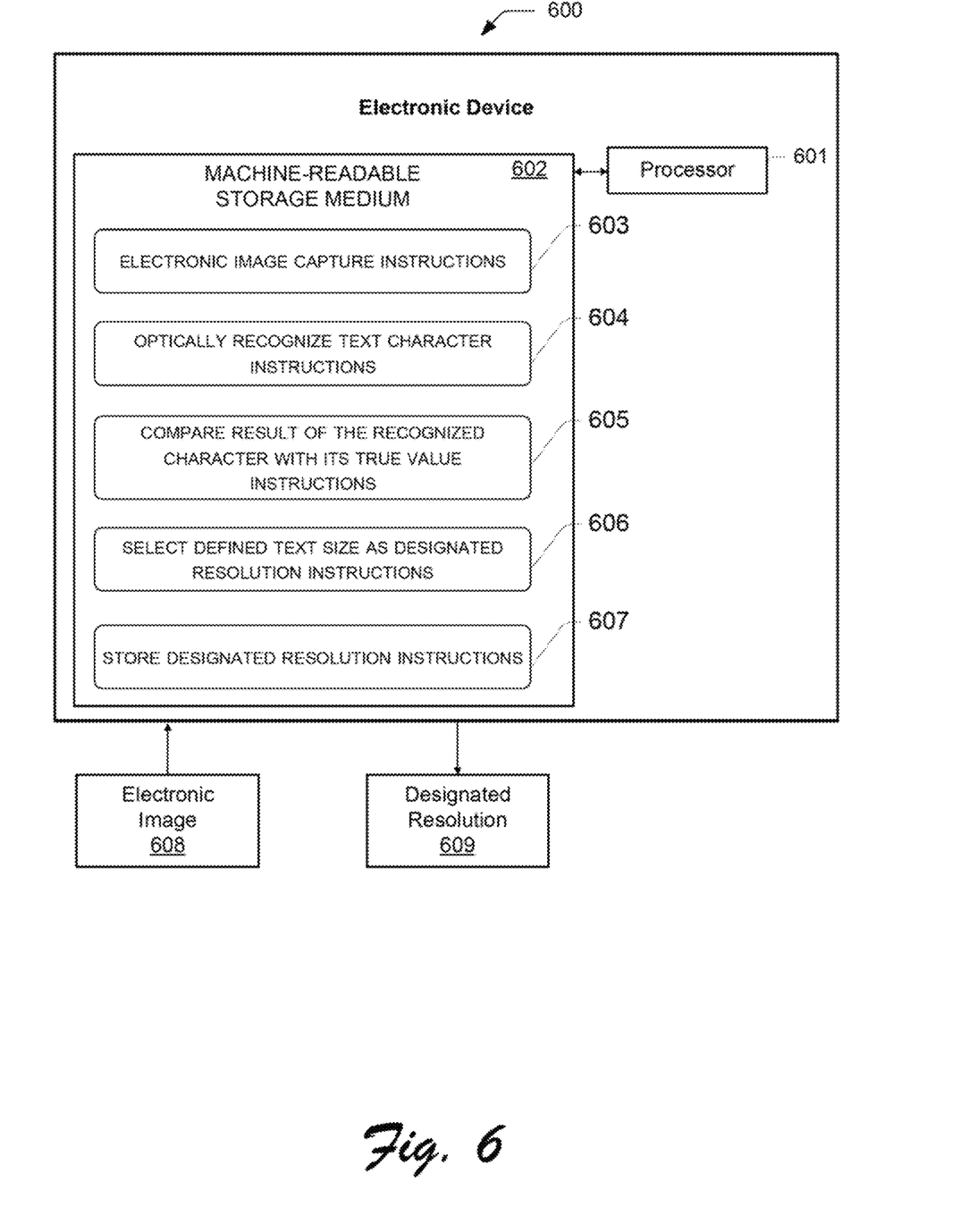
FIG. 6 is a block diagram of an example electronic device that performs operations in accordance with the present disclosure.

FIG. 6 is a block diagram of an example electronic device that performs operations for determining a designated resolution by accepting an electronic image 608 and making available a designated resolution 609. Electronic device 600 may include any imaging device such as imaging device 101 of FIG. 1. Processor 601 may be one or more central processing units (CPUs), microprocessors, and/or other hardware devices suitable for retrieval and execution of instructions stored in machine-readable storage medium 602. Processor 601 may fetch, decode, and execute instructions 603, 604, 605, 606, and 607 to enable execution of applications, as described below. As an alternative, processor 601 may include one or more electronic circuits comprising a number of electronic components for performing the functionality of one or more of instructions 603, 604, 605, 606, and 607. The processor 601 make take the form of a processor described in other embodiments such as the embodiment illustrated in FIG. 1 where a electronic device 123 includes a processor 104.

Machine-readable storage medium 602 may be any electronic, magnetic, optical, or other physical storage device that stores executable instructions. Thus, machine-readable storage medium 602 may be, for example, Random Access Memory (RAM), an Electrically-Erasable Programmable Read-Only Memory (EEPROM), a storage drive, an optical disc, and the like. As described in detail below, machine-readable storage medium 602 may be encoded with executable instructions for capturing electronic images and obtaining a designated resolution.

Electronic image capture instructions 122 may initially receive an electronic image 608. For example, an image 608 may be received from image sensor 103 of FIG. 1, from image capturing device 201 of FIG. 2. Optically recognize text character instructions 604 may then perform one or more operations on the received electronic image 608. For example, the processor 601 may perform a parsing, characterizing, evaluating, or recognition task on one or more portions of the electronic image. The particular instructions may provide a result of the recognition. A result may be an identity for one or more characters appearing in the electronic image 608.

After performing optical recognition instructions 604, compare result instructions 605 are performed by the processor 601. A result of a character recognition is compared against its true value. Based on an outcome of executing the comparison instructions 605, select a defined text size as designated resolution instructions 606 are executed by the processor 601.

Next, store designated resolution instructions 607 are executed by the processor 601. These instructions 607 may provide or otherwise make available a designated resolution 609 to one or more processors such as processor 603 in FIG. 6. Alternatively, these instructions 607 may provide or otherwise make available a designated resolution 710 to one or more memories.

Figure 7:
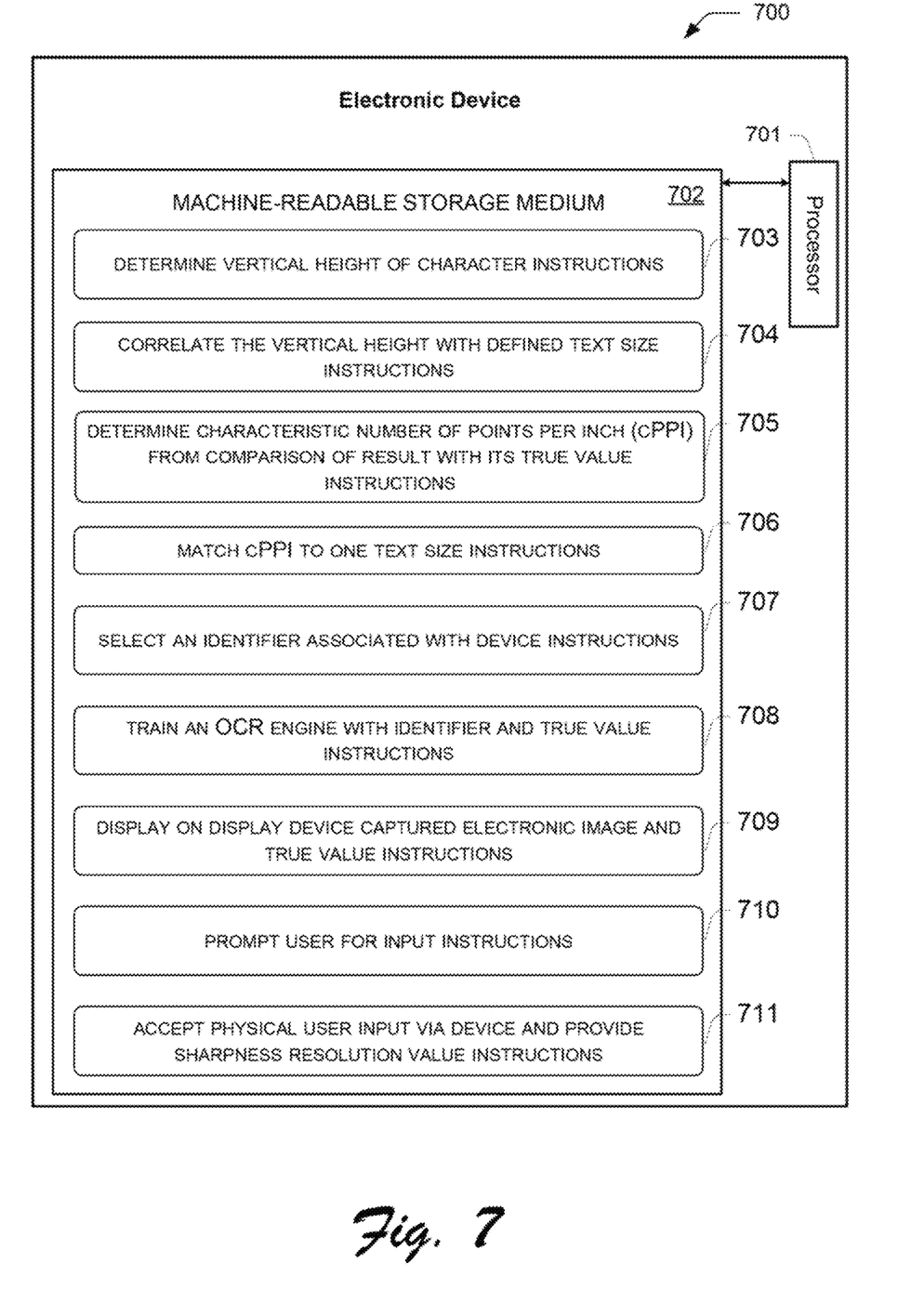
FIG. 7 is a block diagram of an example electronic device that performs operations for executing instructions in accordance with the present disclosure.

FIG. 7 is a block diagram of an example system such as a electronic device 700 that performs operations for executing instructions beyond those illustrated in FIG. 7 and described in relation thereto. In FIG. 7, electronic device 700 may include any imaging device such as imaging device 101 of FIG. 1. In the example embodiment of FIG. 1, a electronic device 123 includes a processor 104.

Processor 701 may be one or more central processing units (CPUs), microprocessors, and/or other hardware devices suitable for retrieval and execution of instructions stored in machine-readable storage medium 702. Processor 701 may fetch, decode, and execute instructions 703-711, singly or in groups of instructions, to enable execution of applications and operations, as further described below. As an alternative, processor 701 may include one or more electronic circuits comprising a number of electronic components for performing the functionality of one or more of instructions 703-711.

Machine-readable storage medium 702 may be any electronic, magnetic, optical, or other physical storage device that stores executable instructions. Thus, machine-readable storage medium 702 may be, for example, Random Access Memory (RAM), an Electrically-Erasable Programmable Read-Only Memory (EEPROM), a storage drive, an optical disc, and the like. As described in detail below, machine-readable storage medium 702 may be encoded with executable instructions for processing electronic images and information derived therefrom, and providing electronic output of various kinds.

Determine vertical height of character instructions 703 may be executed by the processor 701 to thereby determine an example aspect of a character represented in an electronic image such as image 709 of FIG. 7, and image 112 of FIG. 1.

In FIG. 7, correlate the vertical height with defined text size instructions 704 may be executed. A vertical height for one or more characters may be correlated with a defined text size. The vertical height may correspond to, match or approximately match a pre-determined, known standard text size or a defined text size. By way of example, a vertical height may be correlated to a 12-point font size based on a height identified from one or more characters in an electronic image such as image 709 of FIG. 7.

Also in FIG. 7, determine characteristic number of points per inch (cPPI) from comparison of result with its true value instructions 705 may be executed by the processor 701. Based on an aspect of a potential character, instructions 705 may determine a cPPI from a successful comparison of a result of recognizing a text character with its true value. Further instructions may be executed. For example, match cPPI to one text size instructions 706 are executed to determine a text size based on the cPPI.

In FIG. 7, further instructions may be executed. Select an identifier associated with device instructions 707 can be executed by the processor 701. As an example, a serial number or a model number is selected. Subsequently, train an OCR engine with identifier and true value instructions 708 may be executed. An OCR engine or related instructions may thereby be trained to exhibit improved recognition when provided with the serial number or model number of an image capture device in addition to a character image. Other information may be provided or obtained as an identifier in instructions 708.

According to a further implementation, display on display device captured electronic image and true value instructions 709 may be executed by the processor 701 to provide to a user on an electronic display an image of one or more characters. The characters may already be recognized or may not already be recognized. Following instructions 709, prompt user for input instructions 710 can be executed by processor 701. In response, a user is prompted to provide user input.

Yet further instructions may be executed. For example, in FIG. 7, accept physical user input via device and provide sharpness resolution value instructions 711 can be executed by processor 701 by accessing the instructions 711 from the machine-readable storage medium 702.

In addition, the examples described herein may also be used to evaluate and further tune sharpness approaches and how well they work in enhancing characters based on whether images pass/fail more often when compared to images that have the sharpness feature turned off. Furthermore, the examples described herein may be used to validate and further tune a sharpness approach dependent on the achieved character recognition accuracy based on character size and font.

The invention claimed is:

1. An electronic system comprising:
an imaging device comprising a lens and an image sensor;
a processor; and
a non-transitory storage medium storing instructions executable on the processor to:
train an optical recognizer based on:
creating a training image comprising a training text character and a label for the training text character, the label comprising a user-entered identity of the training text character based on visual inspection of the training text character on a display screen, wherein the user-entered identity identifies the training text character from among a set of characters, and
using the training image to refine the optical recognizer;
activate the imaging device to capture an electronic image of an optical target including a text character of a defined text size, the electronic image including the text character of the optical target;
generate, based on optical recognition of the electronic image by the trained optical recognizer, an optical recognition result for the text character;
compare the optical recognition result with a true value of the text character included in the optical target;
receive a measure of incident light on the optical target;
based on the comparison and based on the measure of the incident light, determine a designated resolution using the defined text size; and
correlate the designated resolution with the imaging device.

2. The electronic system of claim 1, wherein the optical target comprises a printed page, wherein the defined text size is from a set of whole-number and half-number point sizes per unit of measure of the printed page, and wherein the instructions are executable on the processor to select the defined text size as the designated resolution from the set of whole-number and half-number point sizes per unit of measure of the printed page.

3. The electronic system of claim 1, wherein the instructions are executable on the processor to:
determine a vertical height of the text character from the electronic image;
match the vertical height to a text size of a set of predetermined text sizes; and
select the defined text size based on the text size matched to the vertical height.

4. The electronic system of claim 1, wherein the instructions are executable on the processor to:
determine a font family based on the optical recognition result;
match the determined font family to a text size of a set of predetermined text sizes; and
select the defined text size based on the determined font family.

5. The electronic system of claim 1, wherein the instructions are executable on the processor to:
determine a characteristic number of points per inch (cPPI) from the optical recognition result; and
select the defined text size based on the determined cPPI.

6. The electronic system of claim 5, wherein the instructions are executable on the processor to:
generate a pass value based on the defined text size exceeding a predetermined text size threshold; and
based on the pass value, train the optical recognizer with information from the electronic image.

7. The electronic system of claim 1, wherein the instructions are executable on the processor to:
compare a measured lighting level of reflected light from the optical target with a predetermined lighting threshold to obtain a lighting level result, the measured lighting level defined by an intensity, or a color temperature, or a combination of the intensity and the color temperature;
associate the lighting level result with the electronic image; and
associate the lighting level with the designated resolution.

8. The electronic system of claim 1, wherein the designated resolution comprises a sharpness rating of the electronic image.

9. A non-transitory machine-readable storage medium encoded with instructions executable by a controller of an electronic device to:
receive an electronic image of an optical target captured by an imaging device, the optical target including a text character of a defined text size;

train an optical recognizer based on:
  creating a training image comprising a training text character and a label for the training text character, the label comprising a user-entered identity of the training text character based on visual inspection of the training text character on a display screen, wherein the user-entered identity identifies the training text character from among a set of characters, and
  using the training image to refine the optical recognizer;
optically recognize, using the trained optical recognizer, the text character of the electronic image by generating a result for the text character based on the electronic image;
compare the result for the text character in the optical target with a true value of the text character;
receive a measure of incident light on the optical target;
based on the comparison and based on the measure of the incident light, select the defined text size as a designated resolution; and
store, in an electronic memory, the designated resolution for the imaging device.

10. The non-transitory machine-readable storage medium of claim 9, wherein the instructions are executable by the controller to:
  determine a vertical height of the text character of the electronic image; and
  correlate the vertical height with the defined text size.

11. The non-transitory machine-readable storage medium of claim 9, wherein the instructions are executable by the controller to:
  determine a characteristic number of points per inch (cPPI) from a successful comparison of the result of the text character in the optical target with the true value of the text character; and
  match the cPPI to a text size of a set of predetermined text sizes.

12. The non-transitory machine-readable storage medium of claim 9, wherein the instructions are executable by the controller to:
  select an identifier associated with the imaging device, the identifier related to a physical characteristic of the imaging device; and
  train the optical recognizer with the identifier associated with the imaging device, the result for the text character, and the true value of the text character.

13. The non-transitory machine-readable storage medium of claim 9, wherein the instructions are executable by the controller to:
  display on a physical display device a portion of the electronic image that includes the text character, and the true value of the text character;
  prompt for a user input based on the displayed portion of the electronic image and the true value of the text character; and
  receive, via a physical user input device, the user input for the imaging device, the user input including the user-entered identity of the training text character.

14. The non-transitory machine-readable storage medium of claim 9, wherein the designated resolution comprises a sharpness rating of the electronic image.

15. A method comprising:
activating an imaging device to capture an electronic image of an optical target, the electronic image including a text character of the optical target;
training an optical recognizer based on:
creating a training image comprising a training text character and a label for the training text character, the label comprising a user-entered identity of the training text character based on visual inspection of the training text character on a display screen, wherein the user-entered identity identifies the training text character from among a set of characters, and using the training image to refine the optical recognizer;
generating, using the trained optical recognizer executed in a system comprising a hardware processor, an optical recognition result for the text character based on the electronic image;
comparing the optical recognition result with a true value of the text character of the optical target;
based on the comparison, selecting a defined text size from a set of defined text sizes as a designated resolution;
associating the designated resolution with the imaging device;
receiving a measure of incident light on the optical target; and
setting the designated resolution further based on the measure of the incident light.

16. The method of claim 15, further comprising:
correlating the defined text size with a sharpness rating; and
initiating an electronic communication including the sharpness rating.

17. The method of claim 15, further comprising:
determining, by the trained optical recognizer, a geometric aspect of the text character from the electronic image;
matching, by the trained optical recognizer, the geometric aspect to a text size of the set of defined text sizes; and
selecting, by the trained optical recognizer, the defined text size based on the text size matched to the geometric aspect.

* * * * *